United States Patent
O'Neil et al.

(10) Patent No.: US 12,211,183 B2
(45) Date of Patent: Jan. 28, 2025

(54) SYSTEM, DEVICES AND/OR PROCESSES FOR IMAGE ANTI-ALIASING

(71) Applicant: Arm Limited, Cambridge (GB)

(72) Inventors: Liam James O'Neil, Bedale (GB); Joshua James Sowerby, Twickenham (GB); Yanxiang Wang, Manchester (GB); Samuel James Edward Martin, Waterbeach (GB)

(73) Assignee: Arm Limited, Cambridge (GB)

( * ) Notice: Subject to any disclaimer, the term of this patent is extended or adjusted under 35 U.S.C. 154(b) by 264 days.

(21) Appl. No.: 17/816,655

(22) Filed: Aug. 1, 2022

(65) Prior Publication Data
US 2024/0037713 A1    Feb. 1, 2024

(51) Int. Cl.
 *G06V 40/10*   (2022.01)
 *G06T 3/18*   (2024.01)
 *G06T 5/50*   (2006.01)
 *G06T 5/70*   (2024.01)

(52) U.S. Cl.
 CPC ............... *G06T 5/70* (2024.01); *G06T 3/18* (2024.01); *G06T 5/50* (2013.01); *G06T 2207/10016* (2013.01); *G06T 2207/20084* (2013.01)

(58) Field of Classification Search
 CPC .. A61B 6/037; A61B 5/48; G06T 7/55; G06T 7/11; G06T 17/05; G06T 5/002; G06T 3/0093; G06T 5/50; G06F 18/29; G06V 20/20; B63G 8/001; G05D 1/622
 See application file for complete search history.

(56) References Cited

U.S. PATENT DOCUMENTS 11,875,491 B2 * 1/2024 Davies .................. G06V 10/82
 2023/0005108 A1 * 1/2023 Gopalkrishna ...... H04N 5/2723

FOREIGN PATENT DOCUMENTS

WO    2021236668 A1    11/2021

OTHER PUBLICATIONS

Xiao, et al, "Neural Supersampling for Real-time Rendering," ACM Trans. Graph., vol. 39, No. 4, Article 142, Publication date Jul. 2020, 12 Pages.
Thomas, et al, "A Reduced-Precision Network for Image Reconstruction," ACM Trans. Graph., vol. 39, No. 6, Article 231, Publication date Dec. 2020, 12 Pages.
Riley, et al, "FidelityFX Super Resolution 2.0," https://duckduckgo.com/?q=RILEY%2C+et+al%2C+%22FidelityFX+Super+Resolution+2.0%2C%22+&hps=1&atb=v262-1&ia=web, Mar. 2022, 68 Pages.
Hasselgren, et al, "Neural Temporal Adaptive Sampling and Denoising." https://doi.org/10.1111/cgf.13919, Jul. 13, 2020, 9 Pages.
Burnes, "NVIDIA DLSS 2.0: A Big Leap In AI Rendering," https://www.nvidia.com/en-gb/geforce/news/nvidia-diss-2-0-a-big-leap-in-ai-rendering/, Mar. 23, 2020, Downloaded Aug. 23, 2022, 17 Pages.
Admin, "Temoral AA and the Quest for the Holy Trail," The Code Corsair, https://www.elopezr.com/temporal-aa-and-the-quest-for-the-holy-trail/, Jan. 2, 2022, Downloaded Aug. 23, 2022, 30 Pages.

(Continued)

*Primary Examiner* — Phuoc H Doan
(74) *Attorney, Agent, or Firm* — Berkeley Law &Technology Group, LLP

(57) ABSTRACT

Example methods, apparatuses, and/or articles of manufacture are disclosed that may be implemented, in whole or in part, techniques to apply an image anti-aliasing operation to an image frame.

20 Claims, 10 Drawing Sheets

(56) References Cited

OTHER PUBLICATIONS

Yang, et al, "A Survey of Temporal Antialiasing Techniques," STAR-State of The Art Report, vol. 39, No. 2, 2020, 15 Pages.
Combined Search and Examination Report under Sections 17 and 18(3), App. No. GB2311358.2. Mailed Feb. 12, 2024, 5 pages.
Response to Combined Search and Examination Report under Sections 17 and 18(3), App. No. GB2311358.2. Filled Jul. 8, 2024, 20 pages.

* cited by examiner

SYSTEM, DEVICES AND/OR PROCESSES FOR IMAGE ANTI-ALIASING

BACKGROUND

1. Field

Techniques, devices and processes for application of an anti-aliasing technique to a rendered image are described.

2. Information

Adaptation of computer-generated imagery to different resolutions (e.g., to small resolutions on mobile gaming platforms) may introduce image aliasing, possibly giving rise to "jaggy" edges in rendered content. Temporal Anti-Aliasing (TAA) processes may be employed to mitigate such aliasing effects by, for example, setting pixel values of averages of sub-pixel samples. Such averages of sub-pixel samples may be determined based, at least in part, on temporal accumulation of such sub-pixel samples.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
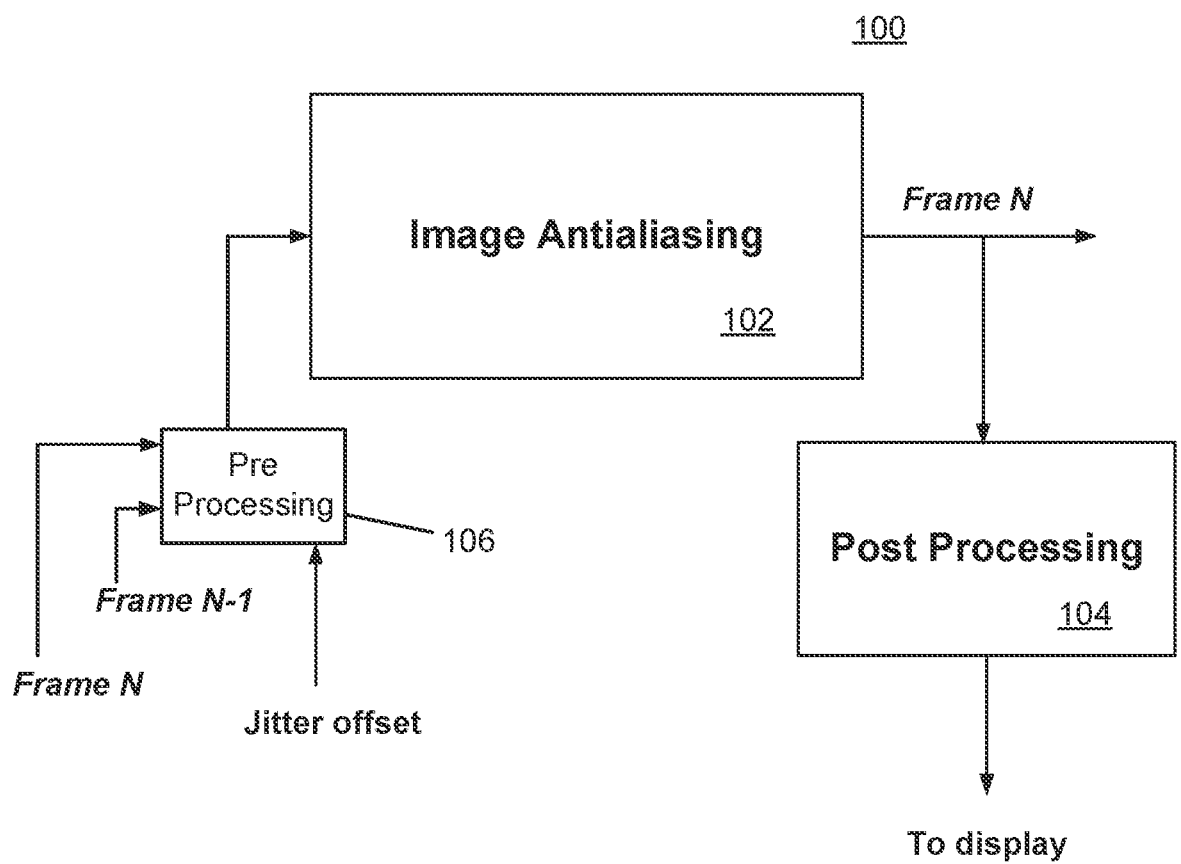
FIG. 1 is a schematic diagram of a system for processing image frames according to an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers at least to the context of the present patent application.

According to an embodiment, Temporal Anti-Aliasing (TAA) techniques may involve processing of image signal intensity values collected over multiple image frames. In an implementation, aliasing may occur if observations and/or samples of an image signal are not obtained at a sufficiently high resolution to avoid distortion and/or artifacts in a reproduced image. To evenly sample different locations within a pixel area, a sub-pixel jitter offset drawn from a sample sequence may be used to shift a viewport temporally on image frames. For example, a viewport sub-pixel jitter offset may be injected to a camera projection matrix to spatially vary different image pixel values in different frames. Samples temporally accumulated from an output of a previous image frame may be reprojected (e.g., resampled) based, at least in part, on application-generated motion vectors to account for camera and/or object motion. Due to changes in occlusion, lighting and/or surface content, for example, a fetched history of image pixel values (e.g., for a previous image) may be invalid and/or inconsistent with image signal intensity values in a current image frame. Application of such invalid image signal intensity values without scrutiny may introduce ghosting and/or image lag artifacts. In a particular implementation, image signal intensity values identified as being invalid may be rejected or rectified. To generate image signal intensity values for a current frame, current image signal intensity values may be accumulated into a warped rectified history at associated pixel locations.

In an implementation, effectiveness of a TAA algorithm may be determined, at least in part, on an ability of such a TAA algorithm to "rectify" a warped anti-aliased history frame. Such a rectification process may involve identifying whether a disocclusion (or warping error) has occurred during reprojection and, in such instances, selecting an alternate color value, known as "clamping" the history. Such a history clamping may rely on rule-defined algorithms which involve use of graphics buffer information such as motion vectors, surface normal, frame buffer/geometry statistics or computing color and/or depth buffer statistics, and may leverage manually tuned heuristics. While such heuristics may be effective in some applications, such heuristics may fall short in producing sufficient image quality in the absence of locality-derived rules. According to an embodiment, such locality-derived rules may be determined, least in part, by training a deep neural network as employed, for example, by NVIDIA's DLSS neural network architecture.

Briefly, in one aspect, implementations disclosed herein relate to a method comprising: establishing one or more image frames having a first pixel resolution; transforming at least one of the one or more image frames to an image frame having a second pixel resolution; and applying the image frame having the second pixel resolution as input values to a neural network to provide parameters to be applied in processing the one or more image frames having the first pixel resolution. Executing such a neural network based on input images at the second resolution may enable implementation of the neural network on a reduced scale without significantly impacting image quality.

In another aspect, implementations are directed to a method comprising: executing a neural network to provide an output feature map and a current output tensor based, at least in part, on a current input tensor; warping the output feature map based, at least in part, on one or more motion vectors; and executing the neural network to provide a subsequent output tensor based, at least in part, on the warped output feature map and a subsequent input tensor. Providing the subsequent output tensor based, at least in part, on the fed back warped feature map, the neural network may enable improved greater temporal stability FIG. 1 is a schematic diagram of a system 100 for processing image frames according to an embodiment in which an anti-aliasing component 102 may determine image signal intensity values associated with pixel locations in an image frame Frame N. According to an embodiment, features of system 100 may be integrated with an electronic device capable of displaying and/or reproducing visual images such as a device capable of generating signals in a particular format to drive a display device. Such a device may comprise, for example, a mobile phone and/or other specialized computing device applicable for gaming, etc.

As shown, anti-aliasing component 102 may determine image signal intensity values of image frame Frame N based, at least in part, on image signal intensity values of frame Frame N−1 and a jitter offset signal. Block 104 may further process image signal intensity values of image frame Frame N for presentation on a display device (e.g., according to a particular image presentation format). Image signal intensity values of a subsequent frame Frame N+1 (not shown) may also be generated based, at least in part, on image signal intensity values of Frame N.

Figure 2:
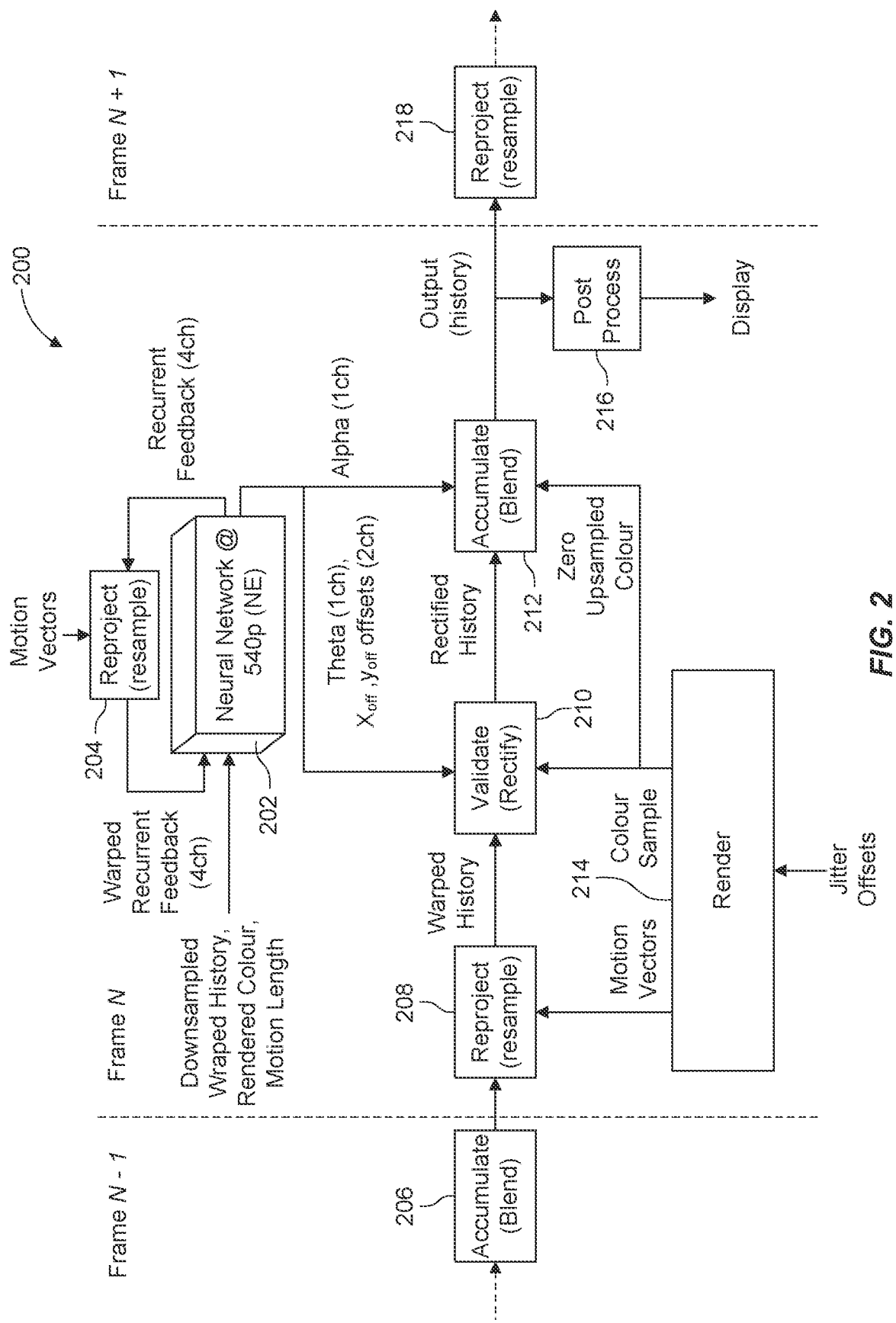
FIGS. 2, 3A and 3B are schematic diagrams of implementations of a system for applying image anti-aliasing operations to an image frame, according to embodiments.

In the particular implementation of FIG. 2, image signal intensity values of a frame Frame N−1 may be warped at reproject operation 208 based, at least in part, on motion vectors supplied from render operation 214. To reduce and/or eliminate ghosting and/or image lag artifacts, validate operation 210 may identify portions of a warped frame produced by reproject operation 208 as being invalid (e.g., to be rejected or rectified). A rectified warped frame produced by validate operation may then be blended and/or combined at accumulate operation 212 with one or more frames generated by render operation 214 to provide a blended image frame. A blended image frame produced by accumulate operation 212 may then be pre-processed at operation 216 for display on a display device (not shown).

According to an embodiment, parameters to be applied in validation operation 210 and/or accumulate operation 212 may be determined as output values provided by neural network (NN) 202 based, at least in part, on warped image frames computed at reproject operation 208, for example. In a particular implementation, NN 202 may define multiple output channels to provide, for example, a per pixel value alpha to be applied by accumulate operation 212 in generating a blended image frame, and a per pixel value theta and a kernel offset values to be applied by validate operation 210.

According to an embodiment, warped image frames provided in an input tensor to NN 202 may be derived, at least in part, from warped image frames provided by reproject operation 208. An input tensor to NN 202 may comprise a warped image frame, a length of a motion vector(s) and/or color sample (e.g., from render operation 214), just to provide a few examples. In a particular implementation, warped image frames provided in an input tensor to NN 202 may comprise downsampled versions of warped image frames provided by reproject operation 208. Likewise, parameters provided in an output tensor of NN 202 may be upsampled to a higher resolution for application to higher resolution image frames at operations 210 and 212. Such a downsampling of a warped image frame in an input tensor and upsampling of parameters in an output tensor to be applied in antialiasing operations may enable a decoupling of NN 202 from any specific size of image frame, and further enable a reduction in scale of NN 202 without significant loss in image quality. As pointed out above, input values received by NN 202 may be based on warped image frames computed by accumulate operation 206. In a particular implementation, a scaling of input values received by NN 202 may be different from and/or decoupled from a scaling of warped image frames produced by reproject operation 208. For example, while reproject operation 208 may provide image signal intensity values of pixels of an image frame having 1920×1080 pixels, inputs received at NN 202 may comprise a downscaled image frame having image signal intensity values for 960×540 pixels. As such, the particular NN model of NN 202 may be independent of a resolution of image frames being processed to address image aliasing, allowing a set implementation of NN 202 to be applied to anti aliasing operations applied to image frames of a different pixel resolution.

According to an embodiment, in addition to receiving warped image frames computed at reproject operation 208 as inputs, NN 202 may receive a recurrent feedback component as input values. As shown, one or more output channels of NN 202 may be processed at reproject operation 204 to be provided as input values to NN 202. In a particular implementation, a recurrent feedback component generated by NN 202 may comprise a time-dependent state such as, for example, feature maps or other temporally relevant, temporally affected state (e.g., "hidden" state of NN 202). Such a recurrent feedback component may then be warped at reproject operation 204 (e.g., based on motion vectors provided by render operation 214) to be provided as input values to NN 202 along with warped image frames generated by reproject operation 208.

As pointed out above, render operation 214 may provide an image frame at a first pixel resolution while NN 202 may receive image frames as part of an input tensor at a second pixel resolution that is lower than the first pixel resolution. In one implementation, validate operation 210 and/or accumulate operation 212 may be executed at the first pixel resolution (of the image frame provided by render operation 214). In another implementation, a reprojected output image frame provided to post processing 216 and reprojection operation 218 is to be upscaled to have a pixel resolution higher than the first pixel resolution. To enable providing such an output image frame at a pixel resolution higher than the first pixel resolution, parameters provided by NN 202 to validate operation 210 and/or accumulate operation 212 may be appropriately upscaled to the higher resolution.

Figure 3A:
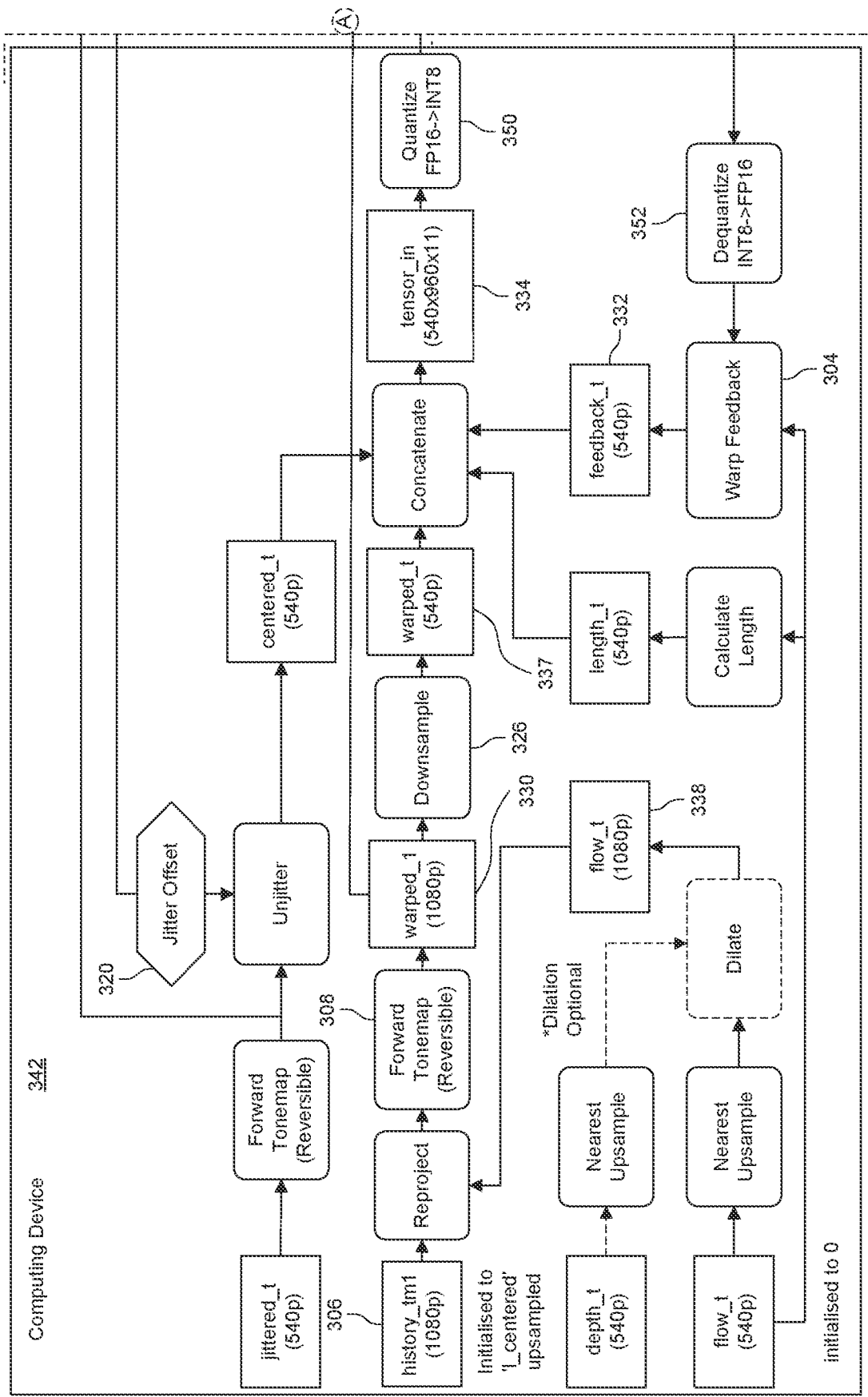
Figure 3B:
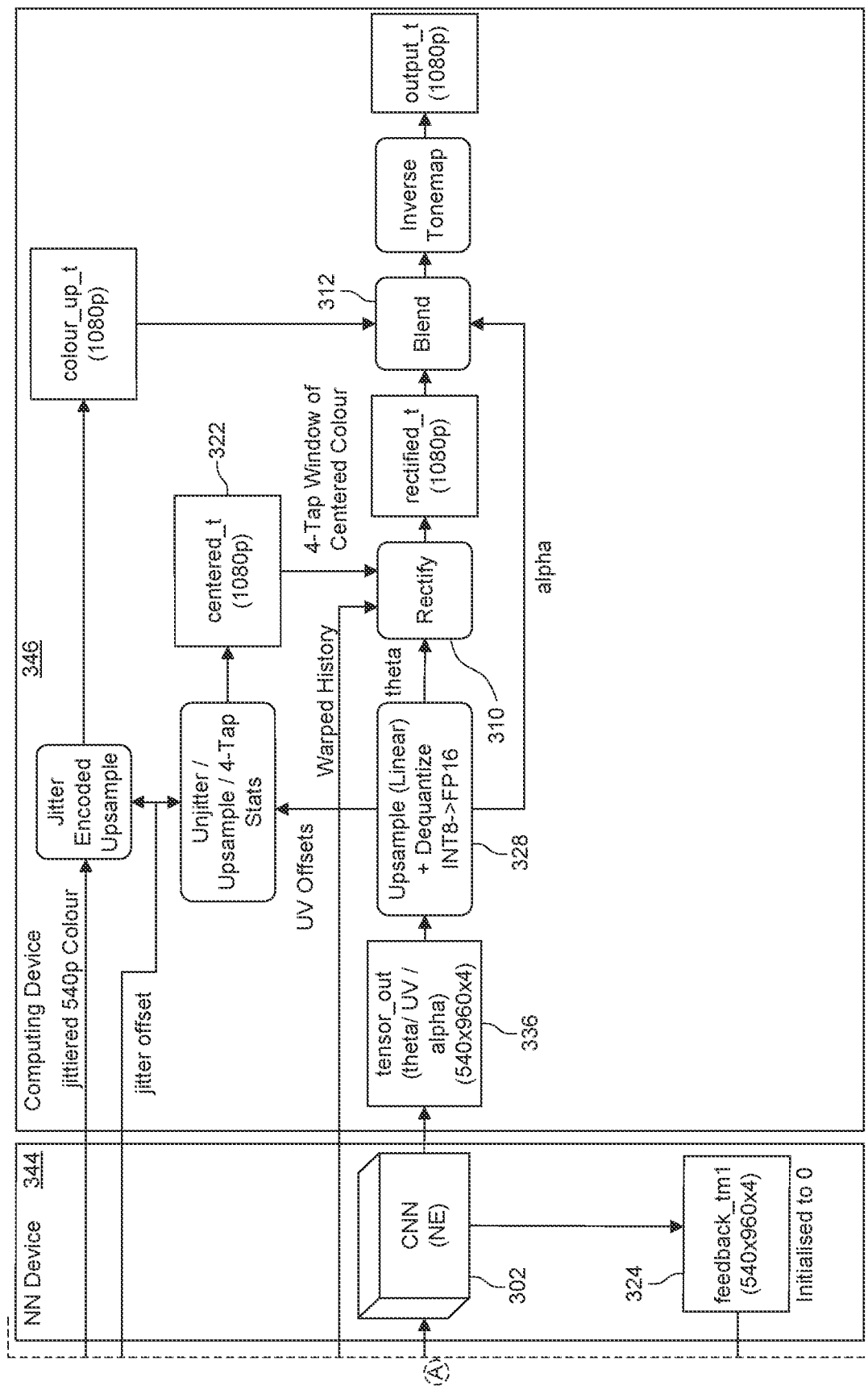

FIGS. 3A and 3B are a schematic diagram of a pipeline implementation of a system for executing image anti-aliasing operations to an image frame, according to embodiments. In a particular implementation, system 300 may comprise one or more computing devices formed on one or more integrated circuit (IC) dies such as one or more IC dies implementing computing devices 342 and 346. System 300 may integrate computing devices 342 and 346 with a NN device 344 formed on a separate IC die, for example. System 300 may implement one or more features of system 200 (FIG. 2). For example, convolutional neural network (CNN) 302 may at least in part implement NN 202 by computing an output tensor 336 comprising parameters to be applied in one or more image anti-aliasing operations based, at least in part, on an input tensor 334 based, at least in part, on a warped image frame 330.

According to an embodiment, reproject operation 308 may compute warped image frame 330 based, at least in part, on an image frame determined for previous time instance 306 and computed motion vectors 338. While warped image frame 330 may express an image one particular pixel resolution (e.g., 1080×1920), downsample operation 326 may generate a warped image frame 337 to express the image frame in a lower pixel resolution (e.g., 540×960). Such a warped image frame 337 expressing an image frame in a lower resolution may be combined with one or more feature maps in a feedback component 332 to form input tensor 334. Elements of input tensor 334 may be quantized at quantization 350 according to an input quantization. Conversely, recurrent feedback 324 may be dequantized at dequantization 352.

According to an embodiment, CNN 302 may compute output tensor 336 and a feedback component 324 on iterations of CNN 302. Feedback component 324 may be warped at block 304 and combined with warped image frame 337 to provide input tensor 334. Output tensor 336 may comprise parameters to be applied in antialiasing operations of computing device portion 346 (e.g., rectify operation 310 and blend operation 312). In a particular implementation, such parameters of output tensor 336 may be upsampled at upsample operation 328 to provide parameters scaled according to a resolution that matches a resolution of a warped image frame of input tensor 334, for example. As pointed out above, executing CNN 302 to provide parameters to be applied to an image frame at a pixel resolution lower than a resolution of warped image frame 337 may enable a smaller scale, less costly design for CNN 302 that does not significantly degrade image quality.

Figure 4:
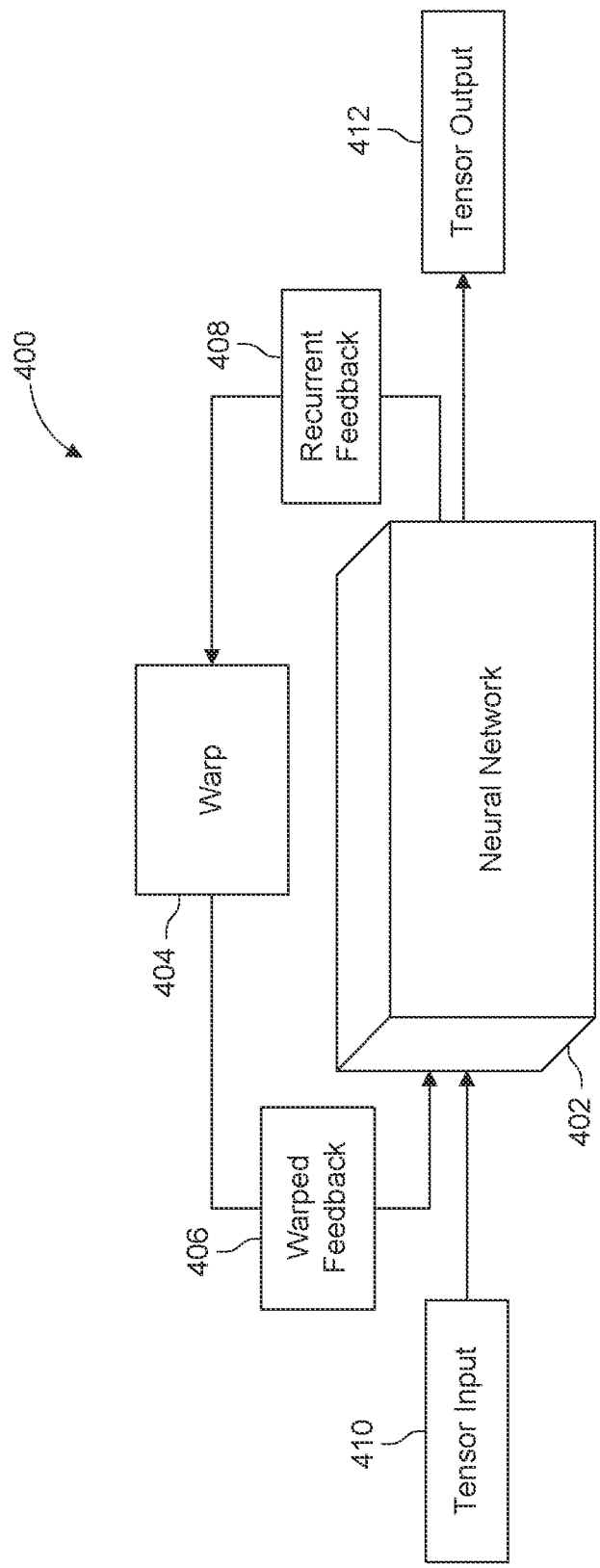
FIG. 4 is a schematic diagram of a system to feedback warped features to an input of a neural network, according to an embodiment.

In another aspect, one or more features of NN 202 may be implemented according to features of NN 402 shown in FIG. 4. NN 402 may compute a tensor output 412 based, at least in part, on tensor input 410 and a warped feedback component 406. While a tensor output of NN 402 may include parameters to be applied in image validation and accumulation operations (e.g., validate operation 210 and/or accumulate operation 212), NN 402 may generate other/different parameters such as, for example, a learnt upsample filter where weights of a bilinear upsample are parameters predicted by NN 402, kernel values for a kernel prediction network for a filter operation, just to provide a couple of examples of parameters that may be determined/predicted by NN 402. According to an embodiment, input tensor 410 may comprise a representation of a content signal such as, for example, audio content and/or image content (e.g., image frames at a particular frame rate). In a particular implementation, input tensor 410 may comprise warped image frames such as warped image frames determined at reproject operation 208. In other implementations, input tensor 410 may comprise a depth map and/or feature maps provided in an output tensor of a different/independent neural network, for example. It should be understood, however, that these are merely examples of content that may be provided in an input tensor received at a neural network, and claimed subject matter is not limited in this respect. Output tensor 412 may comprise predictions of NN 402 such as, for example, parameters to be applied in processing image frames (e.g., parameters alpha and theta as shown in FIG. 2). It should be understood, however, that these are merely examples of parameters that may be provided in an output tensor provided by a neural network, and claimed subject matter is not limited in this respect.

Recurrent feedback 408 may comprise a feature map such as, for example, a map of features extracted from a content signal. Such a content signal may have a time reference in a time dimension, such as image frames in a temporal sequence of image frames. For example, recurrent feedback 408 may comprise features of an image frame such as recurrent feedback generated by NN 202 in combination with the aforementioned alpha value. In another example implementation, recurrent feedback 408 may be constrained by or to be all or a portion of output tensor 412.

According to an embodiment, parameters of NN 202 and/or NN 402 may be determined and/or updated in machine-learning training operations. For example, weights associated with nodes of NN 202 and/or NN 402 may determined and/or updated based, at least in part, on a gradient applied to a loss function in backpropagation applied in training operations. Such a loss function L may be formulated according to expression (1) as follows:

$$L = f[\hat{F}(\text{alpha}, \text{gamma}, x_{off}, y_{off}, W), F], \quad (1)$$

where:
$x_{off}$ and $y_{off}$ are per pixel offsets to be applied to a sampling kernel as part of a validation operation (e.g., according to expression (3));
$\hat{F}$ represents one or more image frames computed based, at least in part, on application of parameters $x_{off}$, $y_{off}$, alpha and gamma (e.g., one or more image frames generated by accumulate operations 212);
F represents one or more ground truth image frames; and
W represents weights associated with nodes of a neural network (e.g., NN 202).

In a particular implementation, function $f$ may comprise any one of several different functions such as, for example, a mean square error (MSE) function. It should be understood, however, that this is merely an example function that may be implemented in a loss function, and claimed subject matter is not limited in this respect.

According to an embodiment, reproject operation 208 may execute a warping process to map image signal intensity values associated with pixel locations in an image frame N−1 generated by accumulate operation 206 to be temporally aligned with frame N. Such a mapping may be determined based, at least in part, on motion vectors generated by render operation 214 according to expression (2) as follows:

$$\text{out}(x,y) = \text{in}(x + u(x,y), y + v(x,y)), \quad (2)$$

where:
in(x,y) is an image signal intensity value associated with a pixel location x,y in an image frame N−1;
out(x,y) is an image signal intensity value associated with a pixel location x,y in an image frame N; and
u(x,y) and v(x,y) are horizontal and vertical displacement components of a motion vector to be applied to an image signal intensity value at a pixel location x,y in an image frame N.

According to an embodiment validate operation 210 may address errors occurring in reproject operation 208 resulting, for example, from disocclusions (e.g., content hidden in FRAME N−1 appearing in a warped frame), or occlusions (e.g., content visible in FRAME N−1 being hidden in a warped frame), which may arise in an artefact that is commonly referred to as "ghosting". Based, at least in part, on image signal intensity values of a current (e.g., aliased) image frame generated by render operation 214, validate operation 210 may validate, reject and/or rectify image signal intensity values associated with pixel locations in a warped image frame generated by reproject operation 208. In one implementation, validate operation 210 may determine "clamped" image signal intensity values of pixels neighboring a corresponding pixel location in a current (e.g., aliased) image frame produced by render operation 214. For example, validate operation 210 may determine statistical descriptors, such as a mean and standard deviation, of image signal intensity values for different color channels for such neighboring pixels. Based, at least in part on such statistical descriptors, validate operation 210 may construct a corresponding three-dimensional axis aligned bounding box (AABB) to determine an extent to which image signal intensity values of a corresponding pixel location in a warped image frame (e.g., from reproject operation 208) are to be accepted or rejected.

Figure 5:
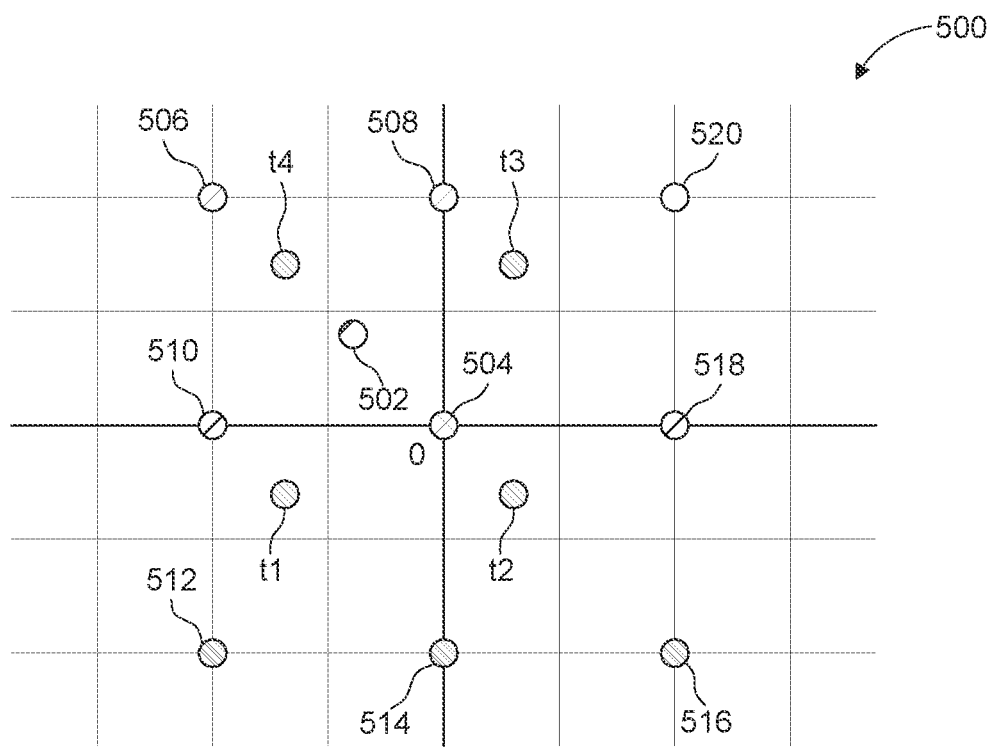
FIGS. 5 and 6 are illustrations of aspects of image anti-aliasing operations, according to embodiments.

In a particular implementation, statistical descriptors of neighboring pixels of a particular pixel location in a current image frame produced by render operation 214 may be determined based, at least in part, on a multi-tap sampling kernel for image signal intensity values of corresponding pixels selected from among the neighboring pixels. FIG. 5 shows a region 500 of nine pixels 504 through 520 in a current image frame centered about pixel 504. A four-tap sampling kernel defined by locations of taps t1, t2, t3 and t4 in a particular pattern (e.g., a box pattern as shown) may determine selection of image signal intensity values of four corresponding pixel locations to compute statistical descriptors covering region 500 of pixels 504 through 520. According to an embodiment, a center of the pattern formed by locations of taps t1, t2, t3 and t4 may be defined, at least in part, as an output parameter of NN 202 as a two-dimensional offset from a location of center pixel 504 to location 502, for example. In the particular example shown in FIG. 5, location 502 (e.g., determined from an offset parameter generated as an output parameter NN 202) positions locations taps t1, t2, t3 and t4 over locations of pixels 510, 504, 508 and 506, respectively.

In the particular implementation of FIG. 5, while placement of taps t1, t2, t3 and t4 may be constrained to a particular pixel window (e.g., 3×3 pixel window or pixel window), location 502 (determining placement of taps t1, t2, t3 and t4) may be varied from location of pixel 504 by an amount based determined as output parameters of NN 202.

Image signal intensity values of pixels corresponding to placement of taps t1, t2, t3 and t4 may then be combined (e.g., as a weighted mean and/or filtered value) to compute a clamp value. According to an embodiment, varying placement of taps t1, t2, t3 and t4 among pixels 504 through 520 may enable NN 202 to implement a anti-aliasing of the computed clamp value by isolating outliers. In a particular implementation, validate operation 210 may determine a combined value mean(x,y,c) for a particular pixel location x, y and a particular color channel c according to expression (3) as follows:

$$\text{mean}(x, y, c) = \frac{1}{N} \sum_{i=0}^{N} ti(x + kx_i + x_{\textit{off}}, y + ky_i + y_{\textit{off}}, c), \quad (3)$$

where:
ti(x,y,c) is an image signal intensity value for a color channel c of a pixel closest to tap ti;
$kx_i$ and $ky_i$ are constant offsets associated with tap ti; and
$x_{\textit{off}}$ and $y_{\textit{off}}$ are offset values determined as output values generated by a trained system (e.g., NN 202, 302 or 402).

In an alternative to clamping image signal intensity values of a warped image to an extent of a computed bounding box as indicated above, one embodiment may apply a per-pixel value parameter from NN 202 to weight image signal values of corresponding pixels in a current frame generated by render operation 214 and a warped image frame generated by reproject operation 208. In a particular implementation, NN 202 may provide a value theta assuming a value in a range [0,1] where theta=0 may reflect a rejection of warped history (e.g., in a warped image frame from reproject operation 208) and theta=1 may reflect an acceptance of a warped history with no modification to its value. This may alleviate instances clamping valid history samples that may fall outside a bounding box, and may substantially improve overall image quality, in both temporal stability and image sharpness (over other TAA techniques).

Figure 6:
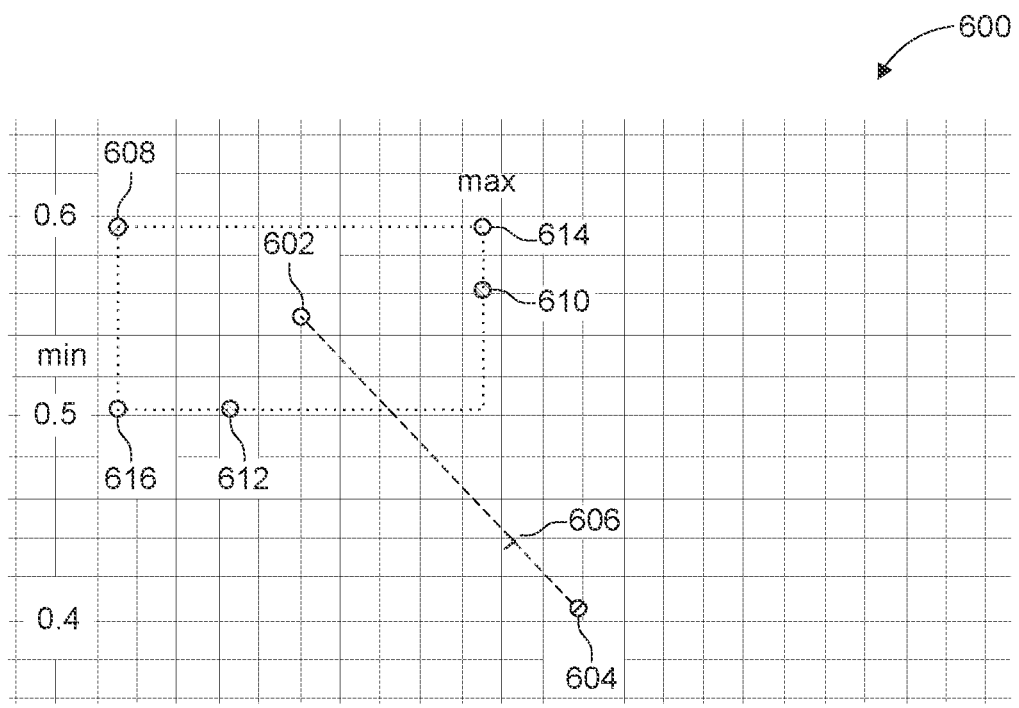

In one implementation as illustrated in FIG. 6, a value of WS(x,y,c) as a weighted sum of image signal intensity values may provide a statistical descriptor of pixels neighboring a particular pixel in a current image frame may be represented by a point 602 while a point 604 may represent an image signal intensity values of a corresponding pixel in a warped image frame (e.g., generated by reproject operation 208). For example, an x-axis may represent a red channel while a y-axis may represent a green channel. It should be understood, however, that clamping may be performed across three or more color channels. A clamped value represented by point 606 may be computed according to expressions (4) and (5) as follows:

$$\text{distance}(x,y,c) = \text{history}(x,y,c) - WS(x,y,c) \quad (4)$$

$$\text{rectified}(x,y,c) = WS(x,y,c) + \text{distance}(x,y,c) \times \text{theta}(x,y) \quad (5)$$

where:
history(x,y,c) is an image signal value for a color channel c at pixel location x, y in a warped image frame; and
rectified(x,y,c) is an image signal value for a color channel c at pixel location x, y in a rectified image frame (e.g., provided by validate operation 210).

According to an embodiment, accumulate operation 212 may compute image signal intensity values of an output image frame based, at least in part, on a rectified image frame received validate operation (e.g., having image signal pixel values computed according to expression (5)), a current image frame generated by render operation 214 and a blending parameter alpha. In a particular implementation, blending parameter alpha may be determined on a per pixel basis as an output of NN 202, for example. Parameter alpha may be applied to image signal intensity values of a current image frame and a rectified image frame to generate image signal intensity values of an output image frame according to expression (6) as follows:

$$y(x,y,c) = \text{alpha}(x,y) \times t_{in}(x,y,c) + \{[1-\text{alpha}(x,y)] \times \text{rectified}(x,y,c)\}, \quad (6)$$

where:
y(x,y,c) is an image signal intensity value for a color channel c at a pixel location x, y in an output image frame;
$t_{in}$(x,y,c) is an image signal intensity value for a color channel c at a pixel location x, y in a current image frame (e.g., provided by render operation 214); and
alpha(x,y) is a blending parameter in a range (e.g., [0.0, 1.0] or [0.1,0.4]) to be applied to image signal intensity values for color channels at a pixel location x, y (e.g., generated by NN 202).

According to an embodiment, $t_{in}$(x,y,c) and alpha(x,y) employed in expression (6) may enable upscaling of an image frame from a lower resolution format to a higher resolution format. For example, values for $t_{in}$(x,y,c) to provide a higher resolution output image frame may be determined using any one of several interpolation-based filtering techniques. Values for alpha(x,y) may be weighted/biased to impart a higher importance to image signal intensity values closer to higher resolution output pixels.

In an embodiment, a relatively large value for alpha may imply greater acceptance of a corresponding portion of a current aliased frame (e.g., generated by render operation 214), which may assist erasure of ghosted and/or occluded content, and accelerate a number of effective samples per pixel maintained in a history. Conversely, a relatively small alpha value may in theory allow accumulation of a larger number of samples per pixel into a history but may be less responsive to erase erroneous rectifications. Generated as a neural network output value (e.g., from NN 202), alpha may be a learnable parameter based on observed behavior to align well with response characteristics, which may be difficult to derive heuristically.

Figure 7:
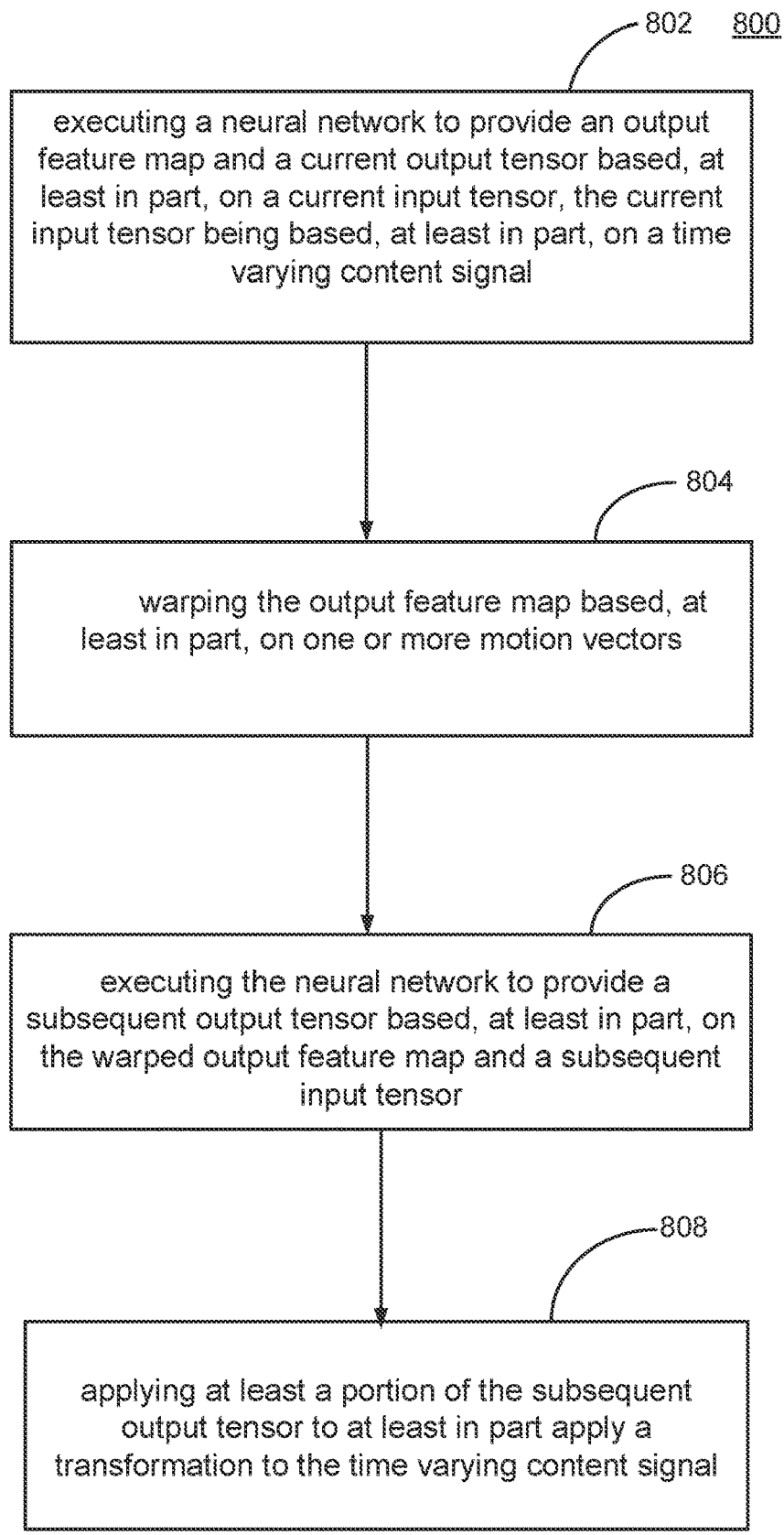
FIG. 7 is a flow diagram of a process to feedback a warped feature map as an input to a neural network, according to an embodiment.

FIG. 7 is a flow diagram of a process 800 to feedback a warped feature map as an input to a neural network, according to an embodiment. In a particular implementation, process 800 may be performed using features of system 400, for example. Block 802 may comprise executing a neural network such as NN 402 to process an input tensor such as, for example, time varying media content such as a temporal sequence of image frames (e.g., image signal intensity values associated with pixel locations an image frame accumulated for FRAME N by accumulate operation 206). In another embodiment, such time varying media content may comprise an audio signal. In a particular implementation, a neural network executed at block 802 may comprise weights associated with nodes where the nodes are determined in machine learning training operations applying backpropagation based on a gradient of a loss function (e.g., a loss function as set forth in expression (1)). Execution of a neural network at block 802 may generate a multi-channel output comprise at least a feature map and an output tensor. Such a feature map may comprise, for example, a feature map relating to content provided in an input tensor such as image signal intensity values associated with pixel locations of an image frame.

According to an embodiment, block 804 may apply a warp operation to a feature map generated at block 802. As pointed out above, such a feature map may comprise a hidden state and/or time-dependent state of a neural network. Additionally, in this context a warp operation may comprise any operation applicable to a feature map to transform the feature in a predictable fashion. Such a warp operation may comprise, for example, referencing a feature map to a different time. In the particular example, in which such a feature map generated at block 802 comprises and/or is based on an image frame in a temporal sequence of image frames, block 804 may apply motion vectors (e.g., generated by render operation 214) to reference a feature map generated at block 802 to a future instance (e.g., according to expression (2)).

According to an embodiment, block 806 may generate a subsequent output tensor based, at least in part, on a warped feature map generated at block 804 and a subsequent input tensor. According to an embodiment, an output tensor generated at block 802 or 806 may comprise parameters that may be applied in image antialiasing operations such as, for example, a validation operation (e.g., validate operation 210) and/or an accumulate operation (e.g., accumulate operation 212). For example, output tensors generated in block 802 and/or 806 may comprise parameters such as $x_{off}$ and $y_{off}$ applied in expression (3), theta(x,y) applied in expression (5) and/or theta(x,y) applied in expression (6). In another implementation, output tensors generated in block 802 and/or 806 may comprise parameters defining a learnt upsample filter (e.g., where weights of a bilinear upsample are provided in an output tensor) or kernel values for a kernel prediction network for a filter operation. Block 808 may comprise applying output tensor values in a transformation of a content signal such as, for example, a filtering operation and/or temporal anti-aliasing operation.

Figure 8:
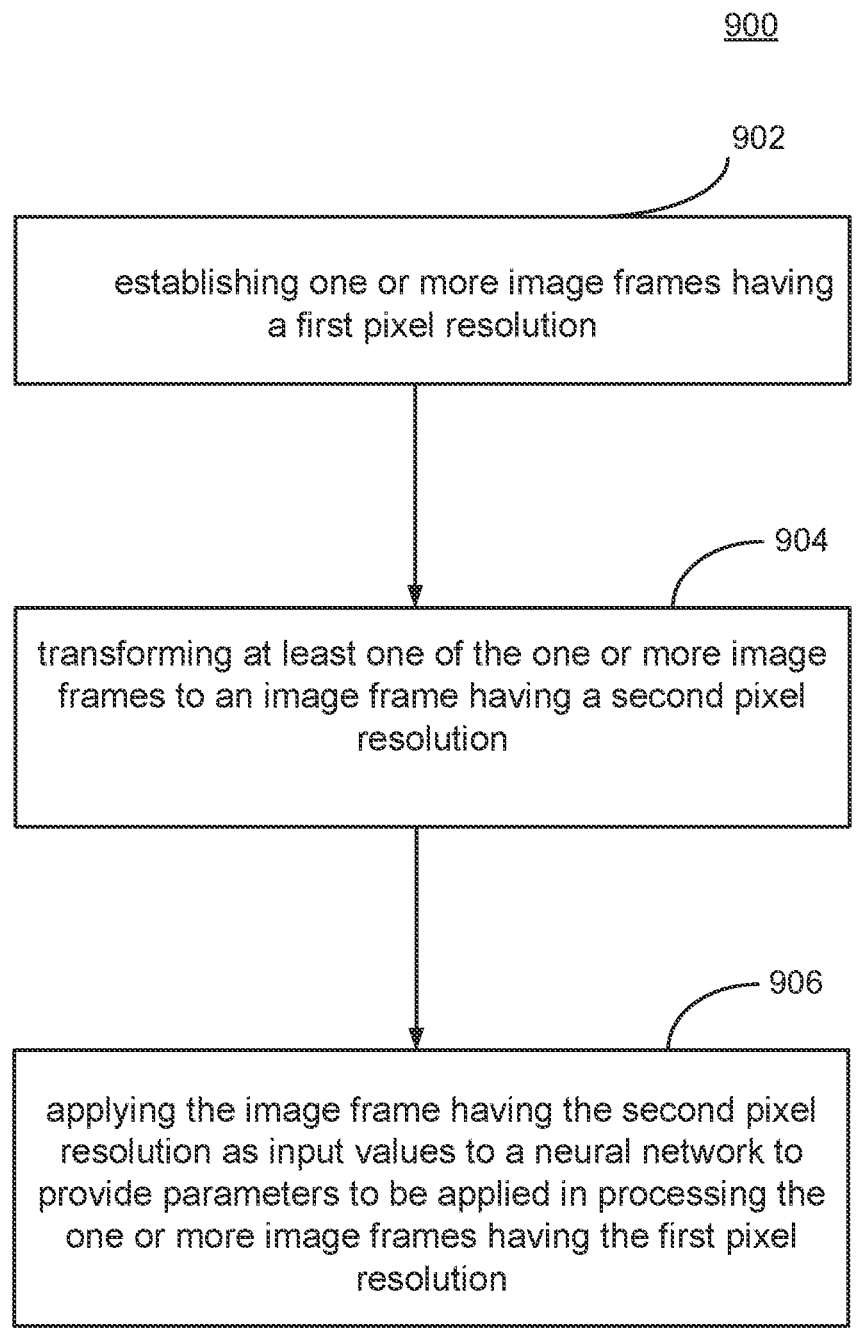
FIG. 8 is a flow diagram of a process to implement an image anti-aliasing feature, according to an embodiment.

FIG. 8 is a flow diagram of a process 900 to implement an image anti-aliasing feature, according to an embodiment. In one particular implementation, process 900 may be performed using features of system 200, such that a scaling of a neural network to produce parameters for executing antialiasing to an image frame may be decoupled from a resolution of the image frame. Block 902 may comprise, for example, establishing an image frame comprising image signal intensity values associated with pixel locations as an output of an accumulate operation such as accumulate operation 206. Block 904 may transform an image frame established at block 902 by, for example, mapping image signal intensity values associated with pixels in the established image frame at a first resolution to image signal intensity values associated with pixels in an image frame at a second resolution that is different from the first resolution. As illustrated in the particular example of system 200 in FIG. 2, block 904 may comprise downsampling a 1920× 1080 image frame received from accumulate operation 208 and/or warped at reproject operation 208 to a 960×540 image frame to be provided as an input tensor to NN 202.

Block 906 may comprise execution of a neural network (e.g., NN 202) based on an image frame at the second resolution provided by block 904 (e.g., downscaled) as an input tensor to NN 202 to generate parameters to be applied in processing an image frame having the first resolution (resolution of the image frame established at block 902). Such parameters generated at block 906 may comprise parameters to be applied in antialiasing operations such as $x_{off}$ and $y_{off}$ applied in expression (3), theta(x,y) applied in expression (5) and/or theta(x,y) applied in expression (6), for example.

According to an embodiment system 200, 300 and/or 400 may be formed by and/or expressed in transistors and/or lower metal interconnects (not shown) in processes (e.g., front end-of-line and/or back-end-of-line processes) such as processes to form complementary metal oxide semiconductor (CMOS) circuitry, just as an example. It should be understood, however that this is merely an example of how circuitry may be formed in a device in a front end-of-line process, and claimed subject matter is not limited in this respect.

It should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Storage media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

If received within a computer system via one or more machine-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process (e.g., wafer fabrication process).

In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

For one or more embodiments, systems 200, 300 and/or 400 may be implemented in a device, such as a computing device and/or networking device, that may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IoT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

In the context of the present patent application, the term "connection," the term "component" and/or similar terms are intended to be physical but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall with the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modelled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

In the context of the present patent application, the terms "entry," "electronic entry," "document," "electronic document," "content,", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term "parameters" (e.g., one or more parameters), "values" (e.g., one or more values), "symbols" (e.g., one or more symbols) "bits" (e.g., one or more bits), "elements" (e.g., one or more elements), "characters" (e.g., one or more characters), "numbers" (e.g., one or more numbers), "numerals" (e.g., one or more numerals) or "measurements" (e.g., one or more measurements) refer to material descriptive of a collection of signals, such as in one or more electronic documents and/or electronic files, and exist in the form of physical signals and/or physical states, such as memory states. For example, one or more parameters, values, symbols, bits, elements, characters, numbers, numerals or measurements, such as referring to one or more aspects of an electronic document and/or an electronic file comprising an image, may include, as examples, time of day at which an image was captured, latitude and longitude of an image capture device, such as a camera, for example, etc. In another example, one or more parameters, values, symbols, bits, elements, characters, numbers, numerals or measurements, relevant to digital content, such as digital content comprising a technical article, as an example, may include one or more authors, for example. Claimed subject matter is intended to embrace meaningful, descriptive parameters, values, symbols, bits, elements, characters, numbers, numerals or measurements in any format, so long as the one or more parameters, values, symbols, bits, elements, characters, numbers, numerals or measurements comprise physical signals and/or states, which may include, as parameter, value, symbol bits, elements, characters, numbers, numerals or measurements examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public. According to an embodiment, a signal packet and/or frame may comprise all or a portion of a "message" transmitted between devices. In an implementation, a message may comprise signals and/or states expressing content to be delivered to a recipient device. For example, a message may at least in part comprise a physical signal in a transmission medium that is modulated by content that is to be stored in a non-transitory storage medium at a recipient device, and subsequently processed.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

Figure 9:
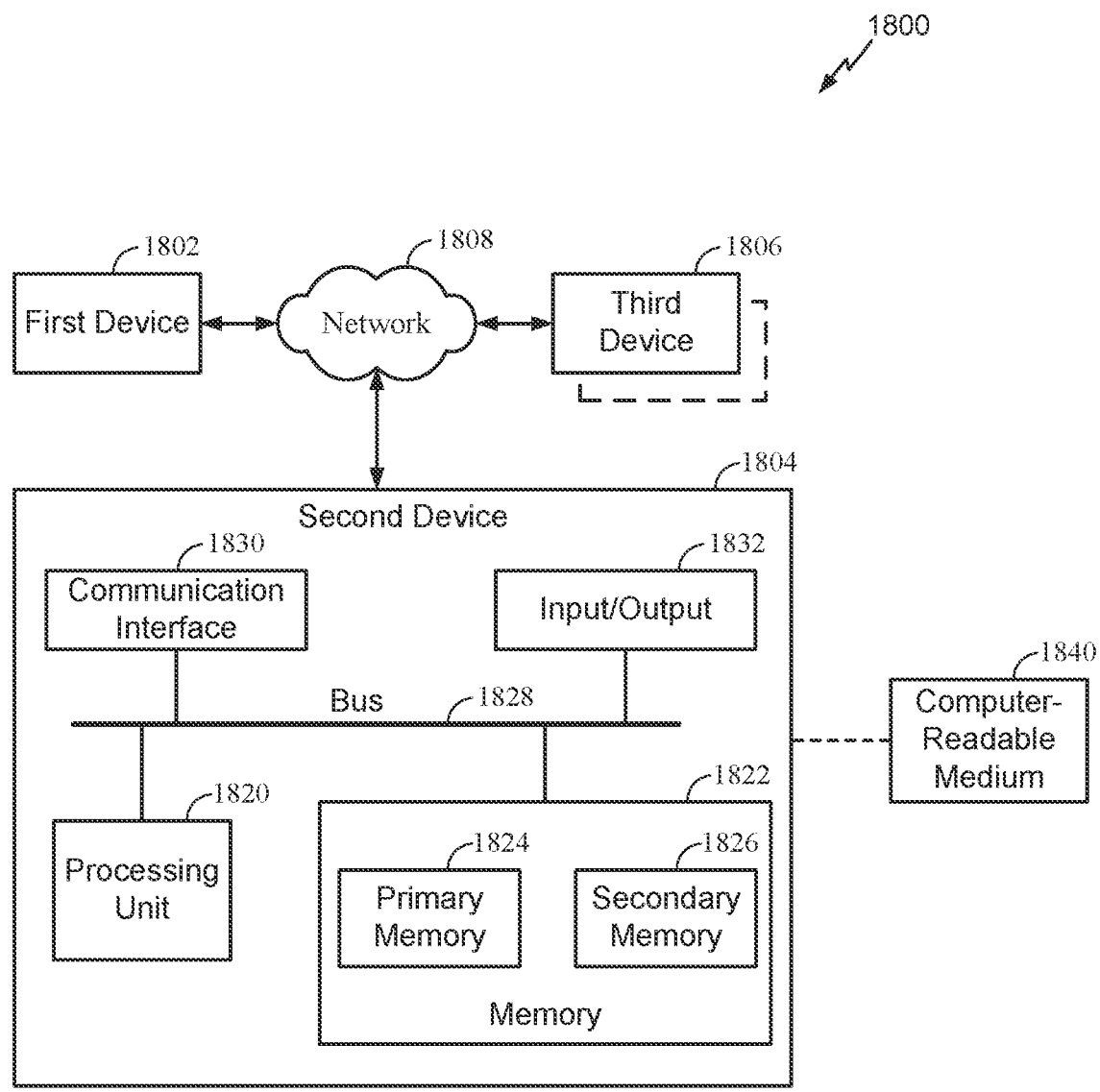
FIG. 9 an example computing system in accordance with an implementation.

FIG. 9 shows an embodiment 1800 of a system that may be employed to implement either type or both types of networks. Network 1808 may comprise one or more network connections, links, processes, services, applications, and/or resources to facilitate and/or support communications, such as an exchange of communication signals, for example, between a computing device, such as 1802, and another computing device, such as 1806, which may, for example, comprise one or more client computing devices and/or one or more server computing device. By way of example, but not limitation, network 1808 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 9 may comprise features, for example, of a client computing device and/or a server computing device, in an embodiment. It is further noted that the term computing device, in general, whether employed as a client and/or as a server, or otherwise, refers at least to a processor and a memory connected by a communication bus. A "processor" and/or "processing circuit" for example, is understood to connote a specific structure such as a central processing unit (CPU), digital signal processor (DSP), graphics processing unit (GPU) and/or neural network processing unit (NPU), or a combination thereof, of a computing device which may include a control unit and an execution unit. In an aspect, a processor and/or processing circuit may comprise a device that fetches, interprets and executes instructions to process input signals to provide output signals. As such, in the context of the present patent application at least, this is understood to refer to sufficient structure within the meaning of 35 USC § 112 (f) so that it is specifically intended that USC § 112 (f) not be implicated by use of the term "computing device," "processor," "processing unit," "processing circuit" and/or similar terms; however, if it is determined, for some reason not immediately apparent, that the foregoing understanding cannot stand and that 35 USC § 112 (f), therefore, necessarily is implicated by the use of the term "computing device" and/or similar terms, then, it is intended, pursuant to that statutory section, that corresponding structure, material and/or acts for performing one or more functions be understood and be interpreted to be described at least in FIG. 2 through 8 and in the text associated with the foregoing figure(s) of the present patent application.

Referring now to FIG. 9, in an embodiment, first and third devices 1802 and 1806 may be capable of rendering a graphical user interface (GUI) for a network device and/or a computing device, for example, so that a user-operator may engage in system use. Device 1804 may potentially serve a similar function in this illustration. Likewise, in FIG. 9, computing device 1802 ('first device' in figure) may interface with computing device 1804 ('second device' in figure), which may, for example, also comprise features of a client computing device and/or a server computing device, in an embodiment. Processor (e.g., processing device) 1820 and memory 1822, which may comprise primary memory 1824 and secondary memory 1826, may communicate by way of a communication bus 1815, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 1804, as depicted in FIG. 9, is merely one example, and claimed subject matter is not limited in scope to this particular example. FIG. 9 may further comprise a communication interface 1830 which may comprise circuitry and/or devices to facilitate transmission of messages between second device 1804 and first device 1802 and/or third device 1806 in a physical transmission medium over network 1808 using one or more network communication techniques identified herein, for example. In a particular implementation, communication interface 1830 may comprise a transmitter device including devices and/or circuitry to modulate a physical signal in physical transmission medium according to a particular communication format based, at least in part, on a message that is intended for receipt by one or more recipient devices. Similarly, communication interface 1830 may comprise a receiver device comprising devices and/or circuitry demodulate a physical signal in a physical transmission medium to, at least in part, recover at least a portion of a message used to modulate the physical signal according to a particular communication format. In a particular implementation, communication interface may comprise a transceiver device having circuitry to implement a receiver device and transmitter device.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IoT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, GNSS receiver and/or other location-identifying type capability, and/or a display with a higher degree of functionality, such as a touch-sensitive color 5D or 3D display, for example.

In FIG. 9, computing device 1802 may provide one or more sources of executable computer instructions in the form physical states and/or signals (e.g., stored in memory states), for example. Computing device 1802 may communicate with computing device 1804 by way of a network connection, such as via network 1808, for example. As previously mentioned, a connection, while physical, may not necessarily be tangible. Although computing device 1804 of FIG. 9 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 1822 may comprise any non-transitory storage mechanism. Memory 1822 may comprise, for example, primary memory 1824 and secondary memory 1826, additional memory circuits, mechanisms, or combinations thereof may be used. Memory 1822 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 1822 may be utilized to store a program of executable computer instructions. For example, processor 1820 may fetch executable instructions from memory and proceed to execute the fetched instructions. Memory 1822 may also comprise a memory controller for accessing device readable-medium 1840 that may carry and/or make accessible digital content, which may include code, and/or instructions, for example, executable by processor 1820 and/or some other device, such as a controller, as one example, capable of executing computer instructions, for example. Under direction of processor 1820, a non-transitory memory, such as memory cells storing physical states (e.g., memory states), comprising, for example, a program of executable computer instructions, may be executed by processor 1820 and able to generate signals to be communicated via a network, for example, as previously described. Generated signals may also be stored in memory, also previously suggested.

Memory 1822 may store electronic files and/or electronic documents, such as relating to one or more users, and may also comprise a computer-readable medium that may carry and/or make accessible content, including code and/or instructions, for example, executable by processor 1820 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, samples, observations, weights, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 9, processor 1820 may comprise one or more circuits, such as digital circuits, to perform at least a portion of a computing procedure and/or process. By way of example, but not limitation, processor 1820 may comprise one or more processors, such as controllers, microprocessors, microcontrollers, application specific integrated circuits, digital signal processors (DSPs), graphics processing units (GPUs), neural network processing units (NPUs), programmable logic devices, field programmable gate arrays, the like, or any combination thereof. In various implementations and/or embodiments, processor 1820 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 9 also illustrates device 1804 as including a component 1832 operable with input/output devices, for example, so that signals and/or states may be appropriately communicated between devices, such as device 1804 and an input device and/or device 1804 and an output device. A user may make use of an input device, such as a computer mouse, stylus, track ball, keyboard, and/or any other similar device capable of receiving user actions and/or motions as input signals. Likewise, for a device having speech to text capability, a user may speak to a device to generate input signals. A user may make use of an output device, such as a display, a printer, etc., and/or any other device capable of providing signals and/or generating stimuli for a user, such as visual stimuli, audio stimuli and/or other similar stimuli.

According to an embodiment, a neural network may comprise a graph comprising nodes to model neurons in a brain. In this context, a "neural network" as referred to herein means an architecture of a processing device defined and/or represented by a graph including nodes to represent neurons that process input signals to generate output signals, and edges connecting the nodes to represent input and/or output signal paths between and/or among neurons represented by the graph. In particular implementations, a neural network may comprise a biological neural network, made up of real biological neurons, or an artificial neural network, made up of artificial neurons, for solving artificial intelligence (AI) problems, for example. In an implementation, such an artificial neural network may be implemented by one or more computing devices such as computing devices including a central processing unit (CPU), graphics processing unit (GPU), digital signal processing (DSP) unit and/or neural processing unit (NPU), just to provide a few examples. In a particular implementation, neural network weights associated with edges to represent input and/or output paths may reflect gains to be applied and/or whether an associated connection between connected nodes is to be excitatory (e.g., weight with a positive value) or inhibitory connections (e.g., weight with negative value). In an example implementation, a neuron may apply a neural network weight to input signals, and sum weighted input signals to generate a linear combination.

According to an embodiment, edges in a neural network connecting nodes may model synapses capable of transmitting signals (e.g., represented by real number values) between neurons. Responsive to receipt of such a signal, a node/neural may perform some computation to generate an output signal (e.g., to be provided to another node in the neural network connected by an edge). Such an output signal may be based, at least in part, on one or more weights and/or numerical coefficients associated with the node and/or edges providing the output signal. For example, such a weight may increase or decrease a strength of an output signal. In a particular implementation, such weights and/or numerical coefficients may be adjusted and/or updated as a machine learning process progresses. In an implementation, transmission of an output signal from a node in a neural network may be inhibited if a strength of the output signal does not exceed a threshold value.

Figure 10:
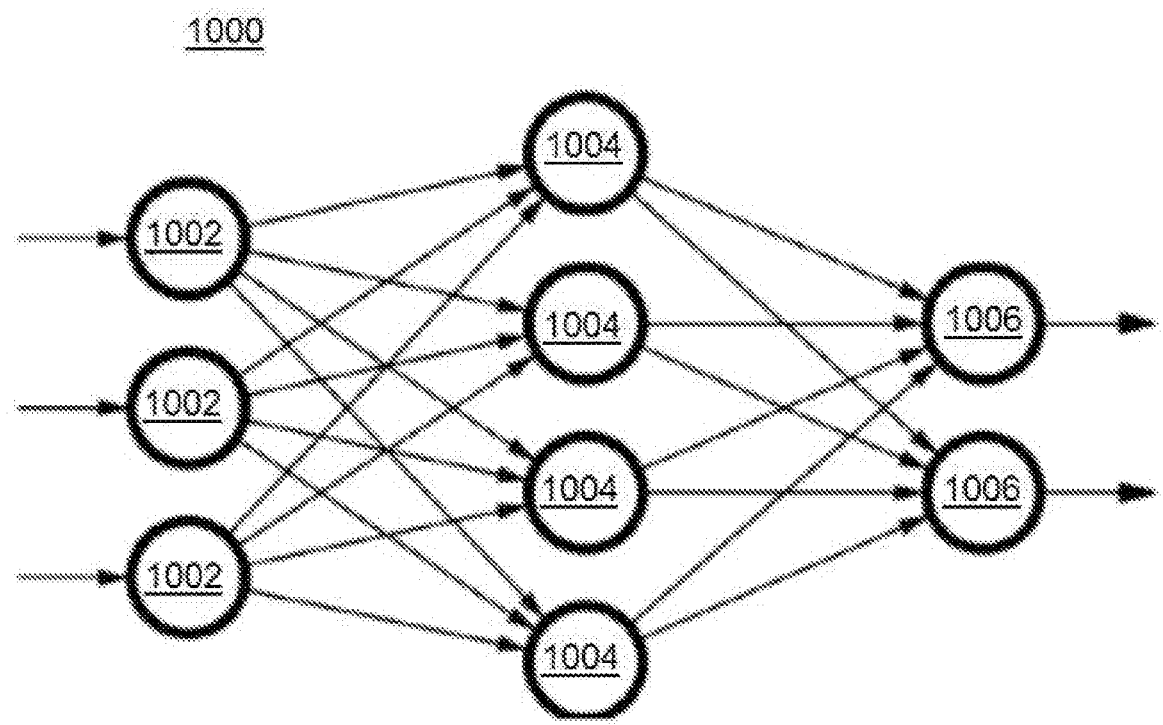
FIG. 10 is a schematic diagram of a neural network formed in "layers", according to an embodiment.

FIG. 10 is a schematic diagram of a neural network 1000 formed in "layers" in which an initial layer is formed by nodes 1002 and a final layer is formed by nodes 1006. All or a portion of features of NN 1000 may be implemented in aspects of systems 200, 300 or 400 such as, for example, NN 202, NN 302 or NN 402, for example. Neural network (NN) 1000 may include an intermediate layer formed by nodes 1004. Edges shown between nodes 1002 and 1004 illustrate signal flow from an initial layer to an intermediate layer. Likewise, edges shown between nodes 1004 and 1006 illustrate signal flow from an intermediate layer to a final layer. While neural network 1000 shows a single intermediate layer formed by nodes 1004, it should be understood that other implementations of a neural network may include multiple intermediate layers formed between an initial layer and a final layer.

According to an embodiment, a node 1002, 1004 and/or 1006 may process input signals (e.g., received on one or more incoming edges) to provide output signals (e.g., on one or more outgoing edges) according to an activation function. An "activation function" as referred to herein means a set of one or more operations associated with a node of a neural network to map one or more input signals to one or more output signals. In a particular implementation, such an activation function may be defined based, at least in part, on a weight associated with a node of a neural network. Operations of an activation function to map one or more input signals to one or more output signals may comprise, for example, identity, binary step, logistic (e.g., sigmoid and/or soft step), hyperbolic tangent, rectified linear unit, Gaussian error linear unit, Softplus, exponential linear unit, scaled exponential linear unit, leaky rectified linear unit, parametric rectified linear unit, sigmoid linear unit, Swish, Mish, Gaussian and/or growing cosine unit operations. It should be understood, however, that these are merely examples of operations that may be applied to map input signals of a node to output signals in an activation function, and claimed subject matter is not limited in this respect. Additionally, an "activation input value" as referred to herein means a value provided as an input parameter and/or signal to an activation function defined and/or represented by a node in a neural network. Likewise, an "activation output value" as referred to herein means an output value provided by an activation function defined and/or represented by a node of a neural network. In a particular implementation, an activation output value may be computed and/or generated according to an activation function based on and/or responsive to one or more activation input values received at a node. In a particular implementation, an activation input value and/or activation output value may be structured, dimensioned and/or formatted as "tensors". Thus, in this context, an "activation input tensor" as referred to herein means an expression of one or more activation input values according to a particular structure, dimension and/or format. Likewise in this context, an "activation output tensor" as referred to herein means an expression of one or more activation output values according to a particular structure, dimension and/or format.

In particular implementations, neural networks may enable improved results in a wide range of tasks, including image recognition, speech recognition, just to provide a couple of example applications. To enable performing such tasks, features of a neural network (e.g., nodes, edges, weights, layers of nodes and edges) may be structured and/or configured to form "filters" that may have a measurable/numerical state such as a value of an output signal. Such a filter may comprise nodes and/or edges arranged in "paths" and are to be responsive to sensor observations provided as input signals. In an implementation, a state and/or output signal of such a filter may indicate and/or infer detection of a presence or absence of a feature in an input signal.

In particular implementations, intelligent computing devices to perform functions supported by neural networks may comprise a wide variety of stationary and/or mobile devices, such as, for example, automobile sensors, biochip transponders, heart monitoring implants, Internet of things (IoT) devices, kitchen appliances, locks or like fastening devices, solar panel arrays, home gateways, smart gauges, robots, financial trading platforms, smart telephones, cellular telephones, security cameras, wearable devices, thermostats, Global Positioning System (GPS) transceivers, personal digital assistants (PDAs), virtual assistants, laptop computers, personal entertainment systems, tablet personal computers (PCs), PCs, personal audio or video devices, personal navigation devices, just to provide a few examples.

According to an embodiment, a neural network may be structured in layers such that a node in a particular neural network layer may receive output signals from one or more nodes in an upstream layer in the neural network, and provide an output signal to one or more nodes in a downstream layer in the neural network. One specific class of layered neural networks may comprise a convolutional neural network (CNN) or space invariant artificial neural networks (SIANN) that enable deep learning. Such CNNs and/or SIANNs may be based, at least in part, on a shared-weight architecture of a convolution kernels that shift over input features and provide translation equivariant responses. Such CNNs and/or SIANNs may be applied to image and/or video recognition, recommender systems, image classification, image segmentation, medical image analysis, natural language processing, brain-computer interfaces, financial time series, just to provide a few examples.

Another class of layered neural network may comprise a recursive neural network (RNN) that is a class of neural networks in which connections between nodes form a directed cyclic graph along a temporal sequence. Such a temporal sequence may enable modeling of temporal dynamic behavior. In an implementation, an RNN may employ an internal state (e.g., memory) to process variable length sequences of inputs. This may be applied, for example, to tasks such as unsegmented, connected handwriting recognition or speech recognition, just to provide a few examples. In particular implementations, an RNN may emulate temporal behavior using finite impulse response (FIR) or infinite impulse response (IIR) structures. An RNN may include additional structures to control stored states of such FIR and IIR structures to be aged. Structures to control such stored states may include a network or graph that incorporates time delays and/or has feedback loops, such as in long short-term memory networks (LSTMs) and gated recurrent units.

According to an embodiment, output signals of one or more neural networks (e.g., taken individually or in combination) may at least in part, define a "predictor" to generate prediction values associated with some observable and/or measurable phenomenon and/or state. In an implementation, a neural network may be "trained" to provide a predictor that is capable of generating such prediction values based on input values (e.g., measurements and/or observations) optimized according to a loss function. For example, a training process may employ back propagation techniques to iteratively update neural network weights to be associated with nodes and/or edges of a neural network based, at least in part on "training sets." Such training sets may include training measurements and/or observations to be supplied as input values that are paired with "ground truth" observations.

Based on a comparison of such ground truth observations and associated prediction values generated based on such input values in a training process, weights may be updated according to a loss function using backpropagation.

One embodiment disclosed herein is directed to a method comprising: establishing one or more image frames having a first pixel resolution; transforming at least one of the one or more image frames to an image frame having a second pixel resolution; and applying the image frame having the second pixel resolution as input values to a neural network to provide parameters to be applied in processing the one or more image frames having the first pixel resolution. In one particular implementation, the second pixel resolution is a lower pixel resolution than the first pixel resolution. In another particular implementation, the method further comprises applying the parameters to the one or more image fames having the first pixel resolution in one or more temporal anti-aliasing operations. For example, the applied parameters to generate an image frame may have a higher resolution than the first pixel resolution and the second pixel resolution. In another example, the parameters to be applied in the processing of the one or more image frames may comprise per pixel coefficients to be applied to image signal intensity values in a validation operation. The per pixel coefficients associated with a pixel may also comprise coefficients to be applied to image signal intensity values associated with contiguous pixels including the pixel, wherein the parameters to be applied in the processing of the one or more image frames comprise an offset relative to a location of the pixel for application of the per pixel coefficients associated with the pixel. In another particular implementation, the method may further comprise: determining a weighted sum of image signal intensity values associated with taps that have been offset from the location of the pixel; and determining a difference between the weighted sum and a warped history of image signal intensity values at the location of the pixel. For example, the parameters to be applied in processing the one or more image frames may further comprise a clamping weight, while method further comprises: applying the clamping weight to the determined difference between the mean and a warped history of image signal intensity values at the location of the pixel to determine a rectified image signal intensity value for the location of the pixel. The parameters to be applied in processing the one or more image frames may further comprise a blending coefficient, while the method further comprises: applying the blending coefficient to the rectified image signal intensity value to determine an accumulated image signal intensity value associated with the location of the pixel.

Another embodiment disclosed herein is directed to an apparatus comprising a memory and one or more processors coupled to the memory to: establish one or more image frames having a first pixel resolution; transform at least one of the one or more image frames to an image frame having a second pixel resolution; and apply the image frame having the second pixel resolution as input values to a neural network to provide parameters to be applied in processing the one or more image frames having the first pixel resolution. In one particular implementation, the second pixel resolution is a lower pixel resolution than the first pixel resolution. In another particular implementation, the one or more processors are further to apply the parameters to the one or more image fames having the first pixel resolution in one or more temporal anti-aliasing operations. For example, the applied parameters to generate an image frame may have a higher resolution than the first pixel resolution and the second pixel resolution. In another example, the parameters to be applied in the processing of the one or more image frames may comprise per pixel coefficients to be applied to image signal intensity values in a validation operation. The per pixel coefficients associated with a pixel may also comprise coefficients to be applied to image signal intensity values associated with contiguous pixels including the pixel, wherein the parameters to be applied in the processing of the one or more image frames comprise an offset relative to a location of the pixel for application of the per pixel coefficients associated with the pixel. In another particular implementation, the one or more processors may further: determine a weighted sum of image signal intensity values associated with taps that have been offset from the location of the pixel; and determine a difference between the weighted sum and a warped history of image signal intensity values at the location of the pixel. For example, the parameters to be applied in processing the one or more image frames may further comprise a clamping weight, while the one or more processors are further to: apply the clamping weight to the determined difference between the mean and a warped history of image signal intensity values at the location of the pixel to determine a rectified image signal intensity value for the location of the pixel. The parameters to be applied in processing the one or more image frames may further comprise a blending coefficient, while the one or more processors are further to: apply the blending coefficient to the rectified image signal intensity value to determine an accumulated image signal intensity value associated with the location of the pixel.

Another embodiment disclosed herein is directed to an article comprising: a non-transitory storage medium comprising computer-readable instructions stored thereon that are executable by one or more processors of a computing device to express in a circuit device: circuitry to establish one or more image frames having a first pixel resolution; circuitry to transform at least one of the one or more image frames to an image frame having a second pixel resolution; and circuitry to apply the image frame having the second pixel resolution as input values to a neural network to provide parameters to be applied in processing the one or more image frames having the first pixel resolution. In one particular implementation, the second pixel resolution is a lower pixel resolution than the first pixel resolution. In another particular implementation, the instructions are further executable by the computing device to express circuitry to apply the parameters to the one or more image fames having the first pixel resolution in one or more temporal anti-aliasing operations. For example, the applied parameters to generate an image frame may have a higher resolution than the first pixel resolution and the second pixel resolution. In another example, the parameters to be applied in the processing of the one or more image frames may comprise per pixel coefficients to be applied to image signal intensity values in a validation operation. The per pixel coefficients associated with a pixel may also comprise coefficients to be applied to image signal intensity values associated with contiguous pixels including the pixel, wherein the parameters to be applied in the processing of the one or more image frames comprise an offset relative to a location of the pixel for application of the per pixel coefficients associated with the pixel. In another particular implementation, the instructions are further executable by the computing device to express circuitry to determine a weighted sum of image signal intensity values associated with taps that have been offset from the location of the pixel; and circuitry to determine a difference between the weighted sum and a warped history of image signal intensity values at the location of the pixel. For example, the parameters to be applied in processing the one or more image frames may further comprise a clamping weight, the instructions are further executable by the computing device to express circuitry to apply the clamping weight to the determined difference between the mean and a warped history of image signal intensity values at the location of the pixel to determine a rectified image signal intensity value for the location of the pixel. The parameters to be applied in processing the one or more image frames may further comprise a blending coefficient, while the instructions are further executable by the computing device to express circuitry to apply the blending coefficient to the rectified image signal intensity value to determine an accumulated image signal intensity value associated with the location of the pixel.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method comprising:
   executing a neural network to provide an output feature map and a current output tensor based, at least in part, on a current input tensor, the current input tensor being based, at least in part, on a time varying content signal;
   warping the output feature map based, at least in part, on one or more motion vectors;
   executing the neural network to provide a subsequent output tensor based, at least in part, on the warped output feature map and a subsequent input tensor; and
   applying at least a portion of the subsequent output tensor to at least in part apply a transformation to the time varying content signal.

2. The method of claim 1, wherein:
   the time varying content signal comprises a temporal sequence of image frames; and
   the transformation comprises one or more temporal antialiasing operations.

3. The method of claim 2, wherein the current input tensor comprises an image frame, and wherein the current output tensor includes one or more parameters to applicable to rectify a history of image frames for construction of an output image frame.

4. The method of claim 3, the subsequent output tensor further comprises parameters applicable to accumulate the current input tensor with the constructed output image frame.

5. The method of claim 1, and further comprising applying parameters obtained from the subsequent output tensor to one or more image frames in one or more image antialiasing operations.

6. The method of claim 5, wherein the applied parameters obtained from the subsequent output tensor to comprise per pixel coefficients to be applied to image signal intensity values in a validation operation.

7. The method claim of 6, wherein pixel coefficients associated with a pixel comprise coefficients to be applied to image signal intensity values associated with contiguous pixels including the pixel, and wherein the parameters to be applied in the one or more image antialiasing operations to comprise a spatial offset relative to a location of the pixel for application of the pixel coefficients associated with the pixel.

8. The method of claim 7, and further comprising:
   filtering image signal intensity values associated with taps that have been offset from the location of the pixel; and
   determining a difference between the filtered image signal intensity values and a warped history of image signal intensity values at the location of the pixel.

9. The method of claim 8, wherein the parameters to be applied in the one or more image antialiasing operations further comprise a clamping weight, the method further comprising:
   applying the clamping weight to the determined difference between the filtered image signal intensity values and the warped history of image signal intensity values at the location of the pixel to determine a rectified image signal intensity value for the location of the pixel.

10. The method of claim 9, wherein the parameters to be applied in the one or more antialiasing operations further comprise a blending coefficient, the method further comprising:
    applying the blending coefficient to the rectified image signal intensity value to determine an accumulated image signal intensity value associated with the location of the pixel.

11. An apparatus comprising:
    a memory; and
    one or more processors coupled to the memory to:
    initiate execution of a neural network to provide an output feature map and a current output tensor based, at least in part, on a current input tensor, the current input tensor being based, at least in part, on a time varying content signal;
    warp the output feature map based, at least in part, on one or more motion vectors;
    initiate execution of the neural network to provide a subsequent output tensor based, at least in part, on the warped output feature map and a subsequent input tensor; and
    apply at least a portion of the subsequent output tensor to at least in part apply a transformation to the time varying content signal.

12. The apparatus of claim 11, wherein:
    the time varying content signal comprises a temporal sequence of image frames;
    the transformation comprises one or more temporal antialiasing operations;
    the current input tensor comprises an image frame; and
    the current output tensor includes one or more parameters to applicable to rectify a history of image frames for construction of an output image frame.

13. The apparatus of claim 11, wherein:
    the one or more processors are further to:
    apply parameters obtained from the subsequent output tensor to one or more image fames in one or more image antialiasing operations; and
    the applied parameters obtained from the subsequent output tensor to comprise per pixel coefficients to be applied to image signal intensity values in a validation operation.

14. The apparatus of claim 13, wherein:
    the per pixel coefficients associated with a pixel comprises coefficients to be applied to image signal intensity values associated with contiguous pixels including the pixel, and wherein the parameters to be applied in the one or more image antialiasing operations to comprise a spatial offset relative to a location of the pixel for application of pixel coefficients associated with the pixel; and the one or more processors are further to:

filter image signal intensity values associated with taps that have been offset from the location of the pixel; and determine a difference between the filtered image signal intensity values and a warped history of image signal intensity values at the location of the pixel.

15. The apparatus of claim 14, wherein:

the parameters to be applied in the one or more image antialiasing operations further comprise a clamping weight; and the one or more processors are further to:

apply the clamping weight to the determined difference between the filtered image signal intensity values and the warped history of image signal intensity values at the location of the pixel to determine a rectified image signal intensity value for the location of the pixel.

16. An article comprising:

a non-transitory storage medium comprising computer-readable instructions stored thereon that are executable by one or more processors of a computing device to express in a circuit device:

circuitry to initiate execution of a neural network to provide an output feature map and a current output tensor based, at least in part, on a current input tensor, the current input tensor being based, at least in part, on a time varying content signal;

circuitry to warp the output feature map based, at least in part, on one or more motion vectors;

circuitry to initiate execution of the neural network to provide a subsequent output tensor based, at least in part, on the warped output feature map and a subsequent input tensor; and circuitry to apply at least a portion of the subsequent output tensor to at least in part apply a transformation to the time varying content signal.

17. The article of claim 16, wherein:

the time varying content signal comprises a temporal sequence of image frames;

the transformation comprises one or more temporal antialiasing operations;

the current input tensor comprises an image frame; and the current output tensor includes one or more parameters to applicable to rectify a history of image frames for construction of an output image frame.

18. The article of claim 16, wherein:

the instructions are further executable by the computing device to express in the circuit device circuitry to apply parameters obtained from the subsequent output tensor to one or more image fames in one or more image antialiasing operations; and the applied parameters obtained from the subsequent output tensor to comprise per pixel coefficients to be applied to image signal intensity values in a validation operation.

19. The article of claim 18, wherein:

pixel coefficients associated with a pixel comprises coefficients to be applied to image signal intensity values associated with contiguous pixels including the pixel, and wherein the parameters to be applied in the one or more image antialiasing operations to comprise a spatial offset relative to a location of the pixel for application of the pixel coefficients associated with the pixel; and the instructions are further executable by the computing device to express in the circuit device:

circuitry to filter image signal intensity values associated with taps that have been offset from the location of the pixel; and circuitry to determine a difference between the filtered image signal intensity values and a warped history of image signal intensity values at the location of the pixel.

20. The article of claim 19, wherein:

the parameters to be applied in the one or more image antialiasing operations further comprise a clamping weight; and the instructions are further executable by the computing device to express in the circuit device circuitry to apply the clamping weight to the determined difference between the filtered image signal intensity values associated with the taps that have been offset from the location of the pixel and the warped history of image signal intensity values at the location of the pixel to determine a rectified image signal intensity value for the location of the pixel.

\* \* \* \* \*